(12) United States Patent
Murayama et al.

(10) Patent No.: US 6,886,752 B2
(45) Date of Patent: May 3, 2005

(54) PORTABLE ELECTRONIC APPARATUS, IC CARD AND READER/WRITER

(75) Inventors: Yuji Murayama, Tokyo (JP); Shigeru Arisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 09/739,318

(22) Filed: Dec. 19, 2000

(65) Prior Publication Data

US 2001/0025887 A1 Oct. 4, 2001

(30) Foreign Application Priority Data

Dec. 20, 1999 (JP) .......................................... P11-360472

(51) Int. Cl.⁷ .............................................. G06K 19/06
(52) U.S. Cl. ..................................... 235/492; 235/380
(58) Field of Search ................................. 235/492, 375, 235/380, 382–383, 441, 385; 705/22–23, 28; 375/355, 326, 367, 208, 200

(56) References Cited

U.S. PATENT DOCUMENTS

| | | | | |
|---|---|---|---|---|
| 5,237,609 A | * | 8/1993 | Kimura ....................... | 713/193 |
| 5,386,539 A | * | 1/1995 | Nishi .......................... | 711/115 |
| 5,418,353 A | * | 5/1995 | Katayama et al. ........... | 235/375 |
| 5,424,527 A | * | 6/1995 | Takahira ...................... | 235/492 |
| 5,444,222 A | * | 8/1995 | Inoue .......................... | 235/380 |
| 5,502,749 A | * | 3/1996 | Ozaki .......................... | 370/516 |
| 5,574,754 A | * | 11/1996 | Kurihara et al. ............. | 375/367 |
| 5,602,879 A | * | 2/1997 | Wada .......................... | 327/299 |
| 5,737,481 A | * | 4/1998 | Gushima et al. ............. | 386/113 |
| 5,850,187 A | * | 12/1998 | Carrender et al. ........ | 340/10.42 |
| 5,864,588 A | * | 1/1999 | Miyamoto .................... | 375/326 |
| 5,930,304 A | * | 7/1999 | Hollenbeck et al. ........ | 375/316 |
| 5,940,447 A | * | 8/1999 | Connell et al. .............. | 375/316 |
| 6,045,043 A | * | 4/2000 | Bashan et al. ............... | 235/441 |
| 6,161,762 A | * | 12/2000 | Bashan et al. ............... | 235/492 |
| 6,343,744 B1 | * | 2/2002 | Shibata et al. ............... | 235/492 |
| 6,375,082 B1 | * | 4/2002 | Kobayashi et al. ......... | 235/492 |
| 6,587,518 B2 | * | 7/2003 | Charrat ........................ | 375/340 |

FOREIGN PATENT DOCUMENTS

| | | |
|---|---|---|
| EP | 0063026 | 10/1982 |
| JP | 07154288 | 6/1995 |
| JP | 08044832 | 2/1996 |
| JP | 09044615 | 2/1997 |
| JP | 11238148 | 8/1999 |
| JP | 11282978 | 10/1999 |
| JP | 11308146 | 11/1999 |

* cited by examiner

Primary Examiner—Michael G. Lee
Assistant Examiner—Edwyn Labaze
(74) Attorney, Agent, or Firm—Ronald P. Kananen; Rader, Fishman & Grauer PLLC

(57) ABSTRACT

A portable electronic apparatus is disclosed which comprises a detecting element for detecting a high-frequency signal received by an antenna and for outputting the detected signal, a sampling element for sampling the detected signal with regard to a frequency higher than a clock frequency of the detected signal and for outputting sampled results, and a decoding element for decoding data transmitted by the high-frequency signal by use of the signal level distribution of the detected signal derived from the sampled results.

25 Claims, 14 Drawing Sheets

| 1 | 1 | 1 | 1 | 1 | 0 | 0 | 0 |
|---|---|---|---|---|---|---|---|
| 1 | 1 | 1 | 1 | 1 | 1 | 0 | 0 |
| 0 | 1 | 1 | 1 | 0 | 0 | 0 | 0 |
| 0 | 1 | 1 | 1 | 1 | 0 | 0 | 0 |
| 0 | 0 | 1 | 1 | 0 | 0 | 0 | 0 |

FIG. 3B

| 0 | 0 | 0 | 0 | 0 | 1 | 1 | 1 |
|---|---|---|---|---|---|---|---|
| 0 | 0 | 0 | 0 | 0 | 0 | 1 | 1 |
| 0 | 0 | 0 | 0 | 0 | 1 | 1 | 0 |
| 0 | 0 | 0 | 1 | 1 | 1 | 1 | 1 |
| 0 | 0 | 1 | 1 | 1 | 1 | 1 | 1 |

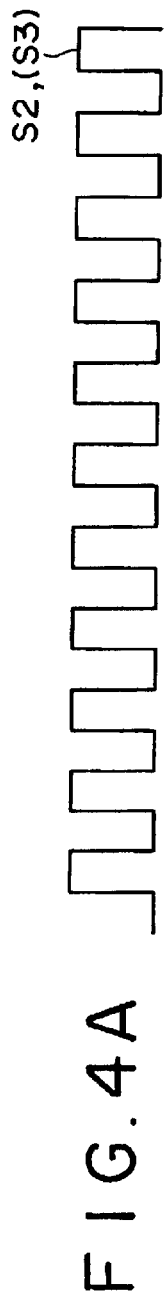
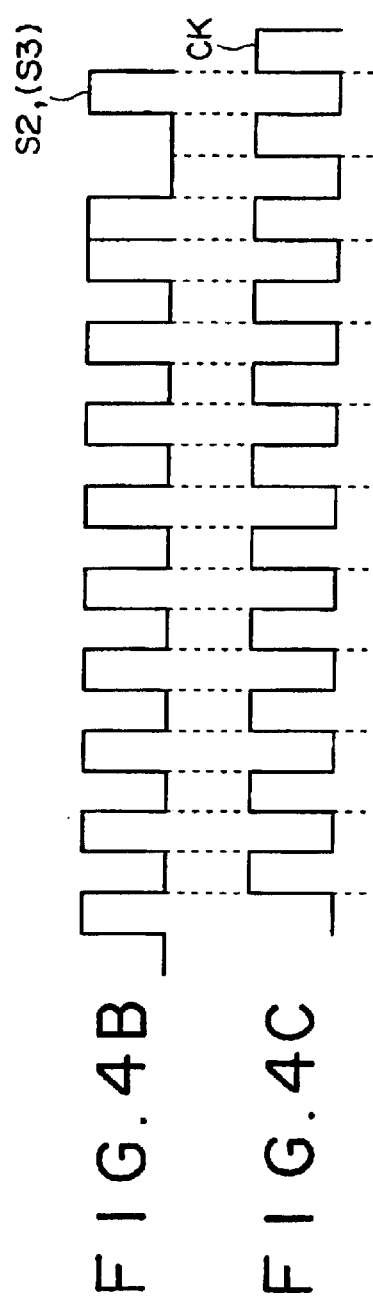
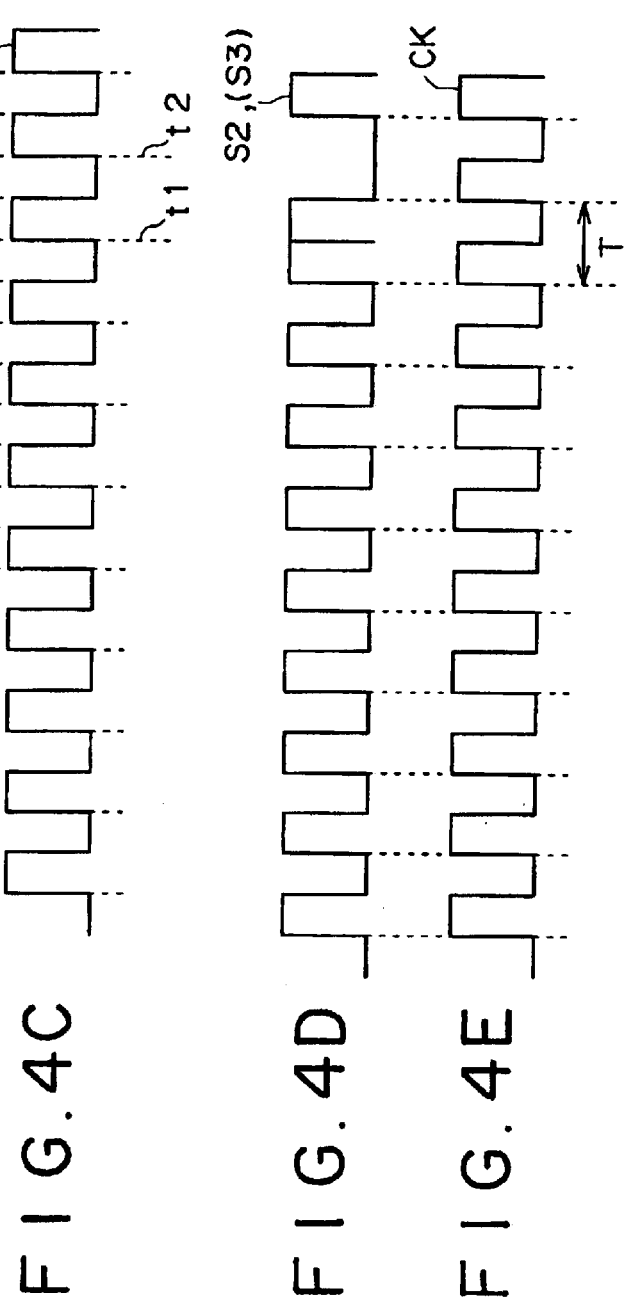
FIG.4A  FIG.4B  FIG.4C  FIG.4D  FIG.4E

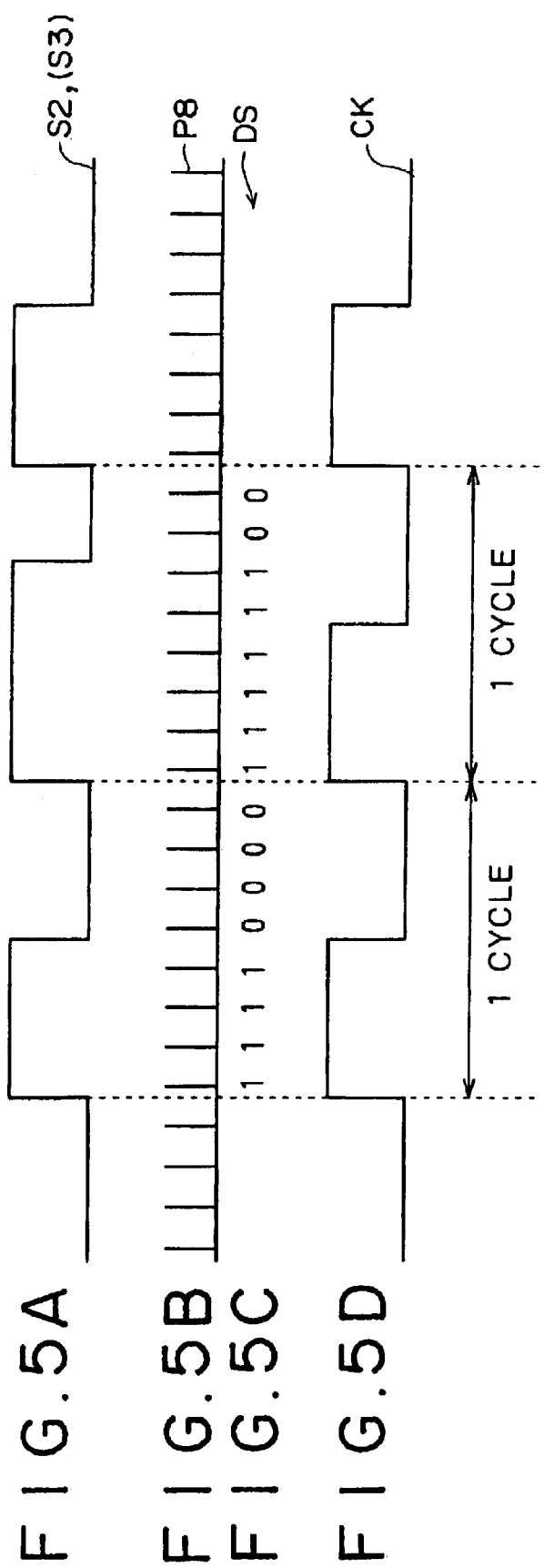

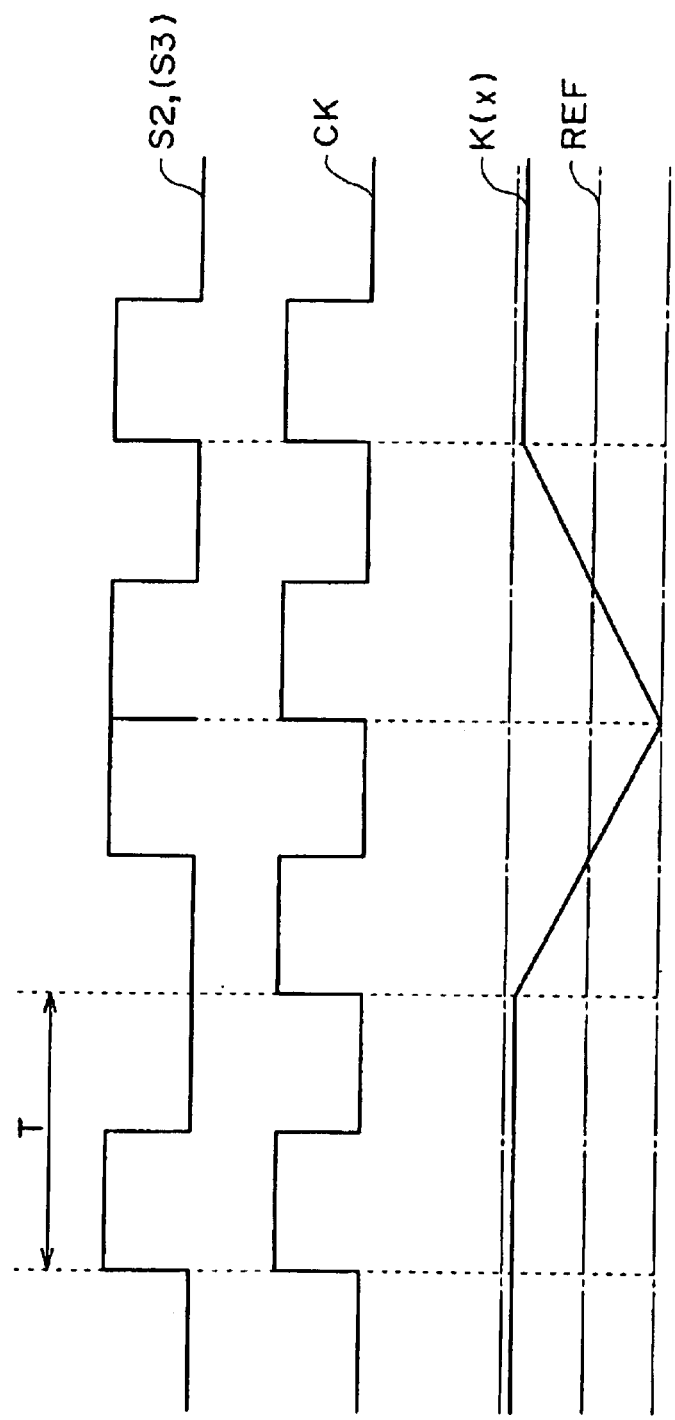

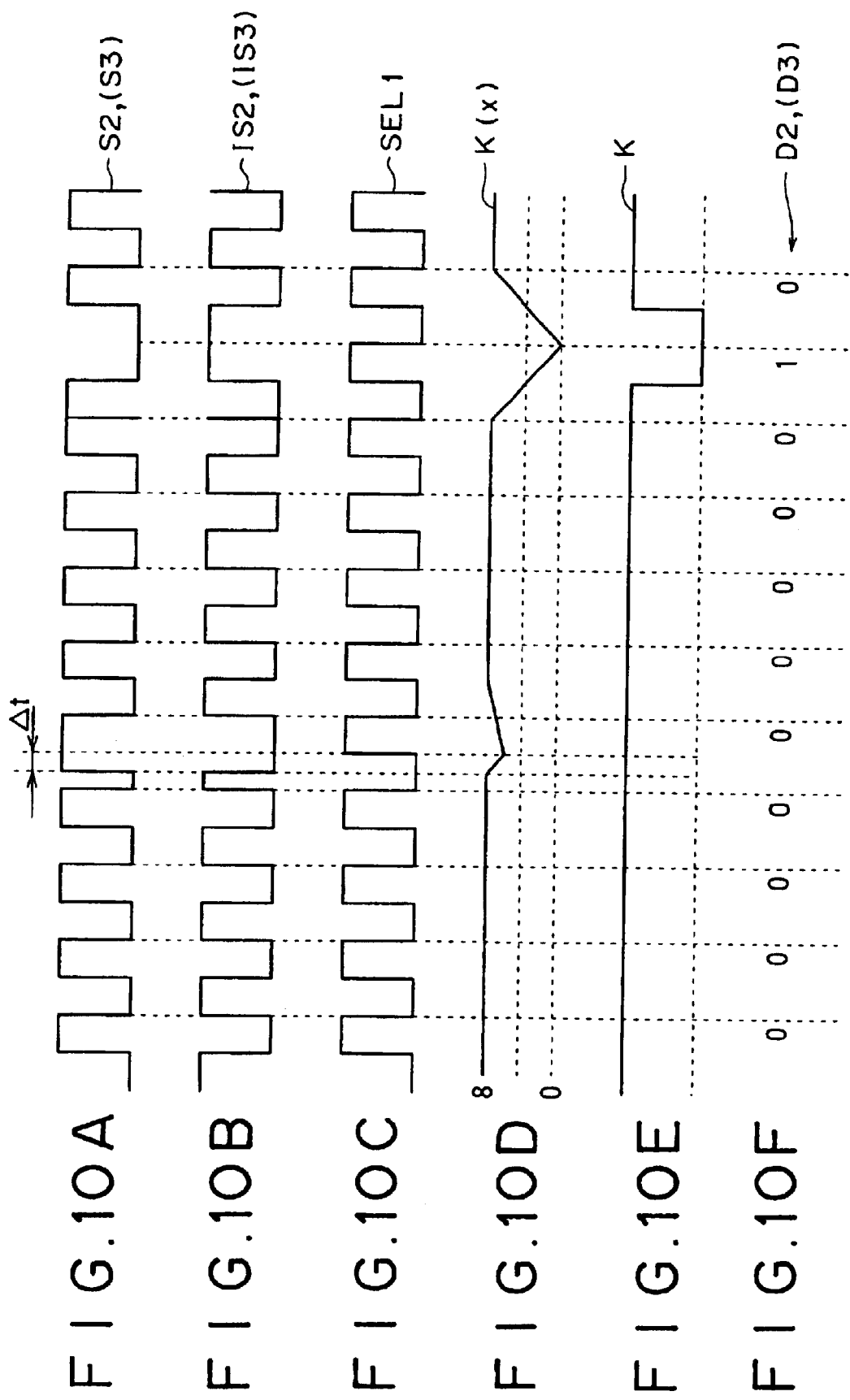

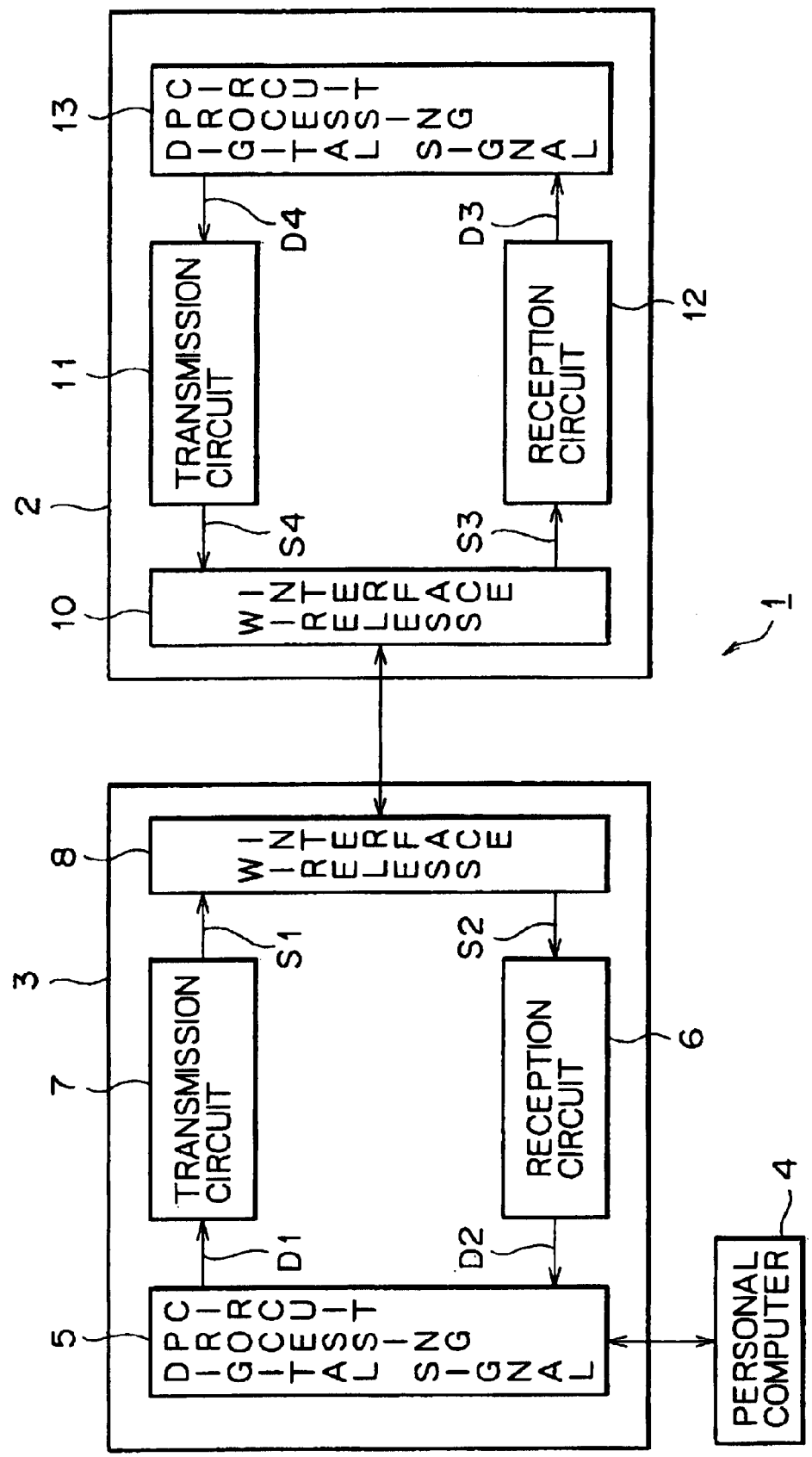

LOGICAL 0

LOGICAL 1

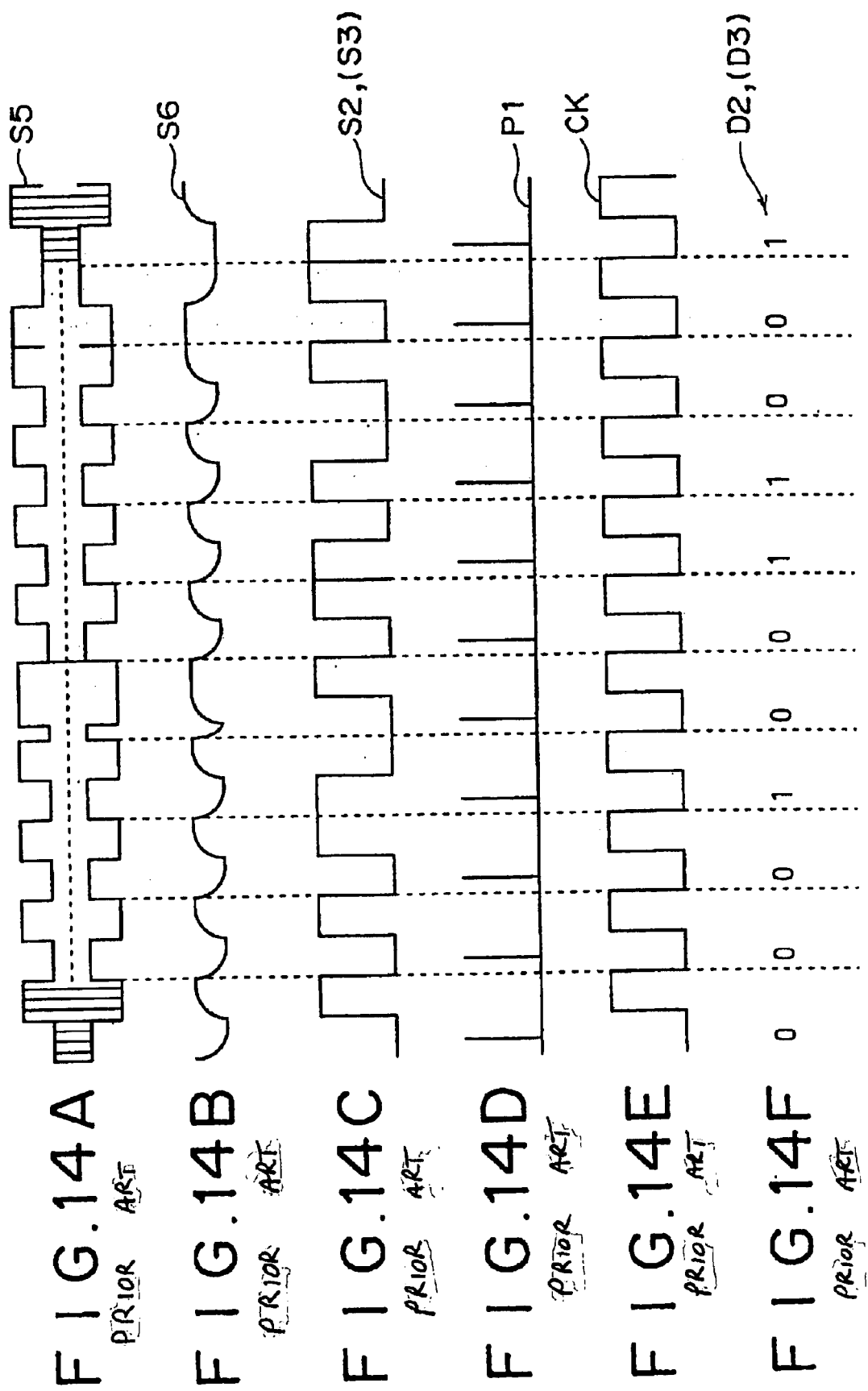

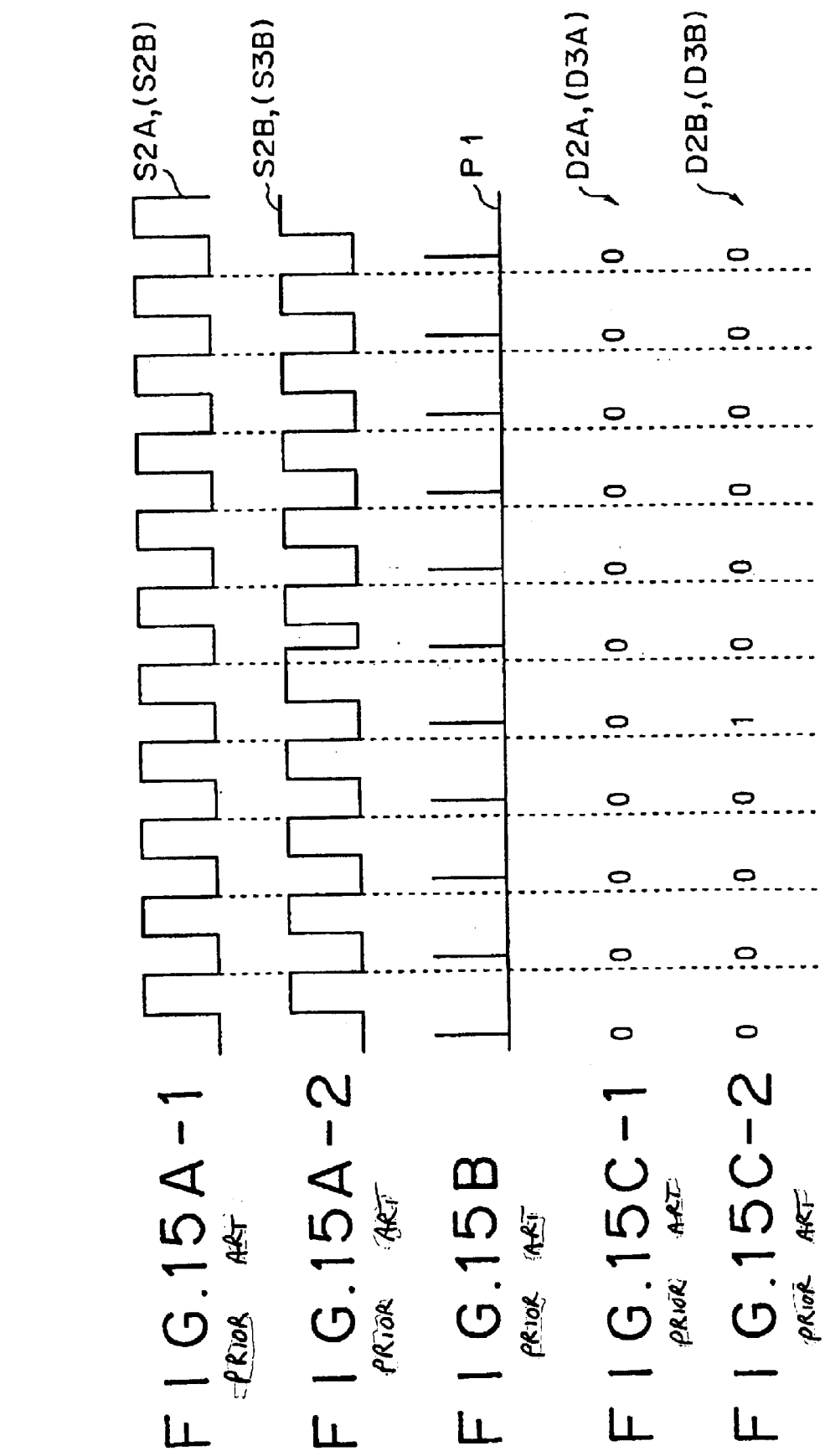

PORTABLE ELECTRONIC APPARATUS, IC CARD AND READER/WRITER

BACKGROUND OF THE INVENTION

The present invention relates to a portable electronic apparatus, an IC card and a reader/writer. More particularly, the invention relates to a non-contact type IC card system which samples results of detection at high speed to decode data based on the signal level distribution of a detected signal and which further decodes data by detecting a correlation value representing the sameness between a clock signal and the detected signal, so that bit errors are sufficiently reduced during deterioration of the detected signal obtained by detection of a high-frequency signal induced on an antenna.

Earlier development, non-contact type IC card systems used in automated ticket inspection systems at railway stations involve having suitable data communicated wirelessly between an IC card and a reader/writer to read data from the card and update the data, if necessary.

FIG. 11 is a block diagram of an IC card system 1. The IC card system 1 in FIG. 11 includes a non-contact type IC card 2, a reader/writer 3 for gaining access to the IC card 2, and a personal computer 4. The personal computer 4 processes results of access by the reader/writer 3 to the IC card 2 in order to manage illustratively the card holder entering or leaving rooms and passing through automated wickets of railway stations.

In the reader/writer 3, a digital signal processing circuit 5 under control of the personal computer 4 outputs send data D1 as serial data to the IC card 2 and processes received data D2 coming as serial data from a reception circuit 6. In inputting and outputting the send data D1 and receive data D2, the digital signal processing circuit 5 requests the IC card 2 to respond for mutual authorization and other processes. Such processes also are used to output retrieved data from the IC card 2 to the personal computer 4 and to update the contents of the card as directed by the personal computer 4.

A transmission circuit 7 receives the send data D1 from the digital signal processing circuit 5 and modulates the data D1 according to a scheme in effect for wireless communication with the IC card 2. The circuit 7 thus generates for output a send signal S1 whose level varies depending on the send data D1. The method used here for data modulation is based illustratively on Manchester encoding. A Manchester code series is brought about by phase modulation, whereby the signal level is inverted across the middle of each bit cell, as shown in FIGS. 12A and 12B. That is, the signal level is switched between a logical 0 and a logical 1.

A wireless interface 8 generates a modulated signal by amplitude-modulating a suitable carrier signal based on the send signal S1. The wireless interface 8 drives the antenna using the modulated signal thus generated so as to transmit the send signal S1 to the IC card 2. Illustratively, the reader/writer 3 supplies the antenna with a carrier signal of a constant amplitude and switches the terminal impedance of the antenna as per the send signal S1, thereby generating the amplitude-modulated signal to drive the antenna.

As the antenna is being fed with the carrier signal of constant amplitude, the wireless interface 8 subjects a high-frequency signal induced on the antenna to amplitude detection, so as to generate a detected signal. The wireless interface 8 further puts the detected signal into binary format to generate a receive signal S2.

The reception circuit 6 regenerates a clock signal from the receive signal S2 and latches the receive signal S2 successively in reference to the clock signal, thereby decoding the receive data D2 sent from the IC card 2. In this manner, the reader/writer 3 exchanges data wirelessly with the IC card 2.

In the IC card 2, a wireless interface 10 detects a high-frequency signal induced on an antenna to generate a detected signal. The interface 10 further subjects the detected signal to binarization to output a receive signal S3. As the IC card 2 physically approaches the reader/writer 3 and as the amplitude of the high-frequency signal induced on the antenna becomes greater than a predetermined value, the receive signal S3 has its signal level inverted to correctly reflect the logic level of the send data D1.

Furthermore, the wireless interface 10 generates a modulated signal by amplitude-modulating a suitable carrier signal according to a send signal S4 output from a transmission circuit 11. The circuit 10 drives the antenna using the modulated signal, thereby transmitting the send signal to the reader/writer 3. The IC card 2 modulates in amplitude the high-frequency signal induced on the antenna by illustratively switching the terminal impedance of the antenna as per the send signal S4, whereby the send signal S4 is transmitted to the reader/writer 3.

A reception circuit 12 regenerates a clock signal from the receive signal S3 and latches the receive signal S3 successively in reference to the clock signal, thereby decoding the receive data D3 corresponding to the send data D1 from the reader/writer 3.

A digital signal processing circuit 13 outputs send data D4 to the transmission circuit 11 in response to the receive data D3, thus responding to a call from the reader/writer 3 and carrying out mutual authorization with the reader/writer 3. During the processing, the digital signal processing circuit 13 reads data from an internal memory for output to the reader/writer 3 and updates the memory contents as directed by the reader/writer 3.

The transmission circuit 11 modulates the send data D4 from the digital signal processing circuit 13, so as to generate the send signal S4 whose signal level varies depending on the send data D4. The method used here for data modulation is the same as that of the reader/writer 3, i.e., the method based illustratively on Manchester encoding. In this manner, the IC card system 1 permits wireless exchanges of appropriate data between the reader/writer 3 and the IC card 2.

FIG. 13 is a block diagram of the reception circuit 6 (and 12). The IC card 2 and the reader/writer 3 each generate a detected signal S6 (FIG. 14B) by detecting a high-frequency signal S5 induced on the respective antenna as an amplitude-modulated signal (FIG. 14A). The detected signal S6 is put into binary format with respect to a predetermined signal level, whereby the receive signal S2 (S3) is generated (FIG. 14C).

The reception circuits 6 and 12 each regenerate a clock signal by having the receive signals S2 and S3 input to a clock generation circuit 15. The clock generation circuit 15 located in an oscillation circuit 16 generates a clock signal CK (FIG. 14E) having substantially the same frequency as that for the receive signals S2 and S3. A phase synchronization circuit 17 compares the clock signal CK with the receive signals S2 and S3 in terms of phase. Given results of the phase comparison, the clock generation circuit 15 provides phase control over the clock signal CK, thus constituting a feedback loop circuit for clock signal (CK) regeneration.

The clock generation circuit 15 further generates a latch pulse P1 (FIG. 14D) that rises upon elapse of one-fourth of one clock cycle following each trailing edge of the clock signal CK from the oscillation circuit 16. A supplementary circuit 18 made of a latching circuit latches the receive signals S2 and S3 successively in reference to the latch pulse P1, thereby decoding the receive data D2 and D3 for output (FIG. 14D).

In the IC card system 1 above, external noise and other disturbances can degrade the S/N ratio of the high-frequency signal induced on the antenna and can abruptly change the signal level of that high-frequency signal. In the IC card 2 and reader/writer 3, degradation of the high-frequency signal in the S/N ratio leads to a waveform distortion in the detected signal and, thus, lowers the quality of the latter. Degraded quality of the detected signal in turn deteriorates the duty ratio of the receive signals S2 and S3 and can trigger their jitters. This produces bit errors in the receive data D2 and D3 that have been obtained by processing of the receive signals S2 and S3.

Illustratively, if receive signals S2A and S3A with a duty ratio of 50% each are correctly input (as shown in FIG. 15A-1), a latch pulse signal P1 (FIG. 15B) may be used to latch the receive signals S2A and S3A successively, whereby receive signal D2A and D3A (FIG. 15C-1) are correctly decoded. On the other hand, if receive signals S2B and S3B have their duty ratio partially deteriorated when input (FIG. 15A-2), it is still possible to generate receive data D2B and D3B (FIG. 15C-2) by successively latching the receive signals S2B and S3B using the latch pulse signal P1. In this case, however, those portions of the receive signals S2B and S3B in which the duty ratio is deteriorated (indicated by arrow A in the figure) produce errors when decoded.

In the above type of wireless communication system, such bit errors in the receive data D2 and D3 caused by the deterioration of detected signal quality are dealt with by an error correction process that produces the send signals D1 and D3. However, as the degree of bit errors worsens, it becomes increasingly difficult for the error correction process to address the errors. Eventually, the data involved need to be retransmitted repeatedly to overcome the errors. This lowers the effective data transmission rate considerably.

Even such repeated data retransmissions may eventually become insufficient for correct data reception. In the end, it may become impossible to exchange data between the IC card 2 and the reader/writer 3.

In the IC card system 1, weak electromagnetic waves are used by the reader/writer 3 and IC card 2 to exchange data therebetween in close proximity. In that setup, a high-frequency signal induced on the antenna is picked up to obtain a detected signal that may degrade in quality. If bit errors caused by the deterioration of the detected signal in quality are reduced, the communicable distance between the reader/writer 3 and the IC card 2 may be increased correspondingly. That in turn makes system 1 more convenient to use. Illustratively, if the IC card system 1 is used in ticket inspection systems at railway stations, passengers carrying IC cards instead of tickers are allowed to pass rapidly through the wickets by the system, thus easing the congestion.

SUMMARY OF THE INVENTION

The present invention has been made in view of the above circumstances and provides a portable electronic apparatus, an IC card, and a reader/writer capable of sufficiently reducing bit errors even if a detected signal obtained by picking up a high-frequency signal induced on an antenna has deteriorated in quality.

In carrying out the invention and according to a first aspect thereof, there is provided a portable electronic apparatus including a detecting element for detecting a high-frequency signal received by an antenna and for outputting the detected signal, a sampling element for sampling the detected signal with regard to a frequency higher than a clock frequency of the detected signal and for outputting sampled results, and a decoding element for decoding data transmitted by a high-frequency signal by use of the signal level distribution of the detected signal derived from the sampled results.

According to a second aspect of the invention, there is provided an IC card for receiving data transmitted by a reader/writer and for outputting data from an internal memory in return, including a detecting element for detecting a high-frequency signal induced on an antenna and for outputting the detected signal, a sampling element for sampling the detected signal with regard to a frequency higher than the clock frequency of the detected signal and for outputting sampled results, and a decoding element for decoding data transmitted by a high-frequency signal by use of the signal level distribution of the detected signal derived from the sampled results.

According to a third aspect of the invention, there is provided a reader/writer for receiving data transmitted by an IC card, including a detecting element for detecting a high-frequency signal induced on an antenna and for outputting the detected signal, a sampling element for sampling the detected signal with regard to a frequency higher than the clock frequency of the detected signal and for outputting sampled results, and a decoding element for decoding data transmitted by a high-frequency signal by use of the signal level distribution of the detected signal derived from the sampled results.

In the portable electronic apparatus, the IC card and the reader/writer described above, the signal level distribution of the detected signal obtained by having the detected signal sampled with respect to a frequency higher than the clock frequency of the detected signal shows a consistent tendency while the same logic level is in effect despite externally applied noises or duty ratio fluctuations. When data transmitted by the high-frequency signal are decoded by use of the signal level distribution, bit errors are sufficiently reduced regardless of the presence of external noise or the duty ratio changes.

According to a fourth aspect of the invention, there is provided a portable electronic apparatus, including a detecting element for detecting a high-frequency signal received by an antenna and for outputting the detected signal, a clock regenerating element for regenerating a clock signal from the detected signal, a correlation value detecting element for detecting the correlation value representing sameness between a clock signal and a detected signal, and a decoding element for decoding data transmitted by a high-frequency signal in accordance with the correlation value.

According to a fifth aspect of the invention, there is provided an IC card for receiving data transmitted by a reader/writer and for outputting data from an internal memory in return, including a detecting element for detecting a high-frequency signal induced on an antenna and for outputting the detected signal, a clock regenerating element for regenerating a clock signal from the detected signal, a correlation value detecting element for detecting the correlation value representing sameness between a clock signal and a detected signal, and a decoding element for decoding data transmitted by a high-frequency signal in accordance with the correlation value.

According to a sixth aspect of the invention, there is provided a reader/writer for receiving data transmitted by an IC card, including a detecting element for detecting a high-frequency signal induced on an antenna and for outputting the detected signal, a clock regenerating element for regenerating a clock signal from the detected signal, a correlation value detecting element for detecting the correlation value representing sameness between a clock signal and a detected signal, and a decoding element for decoding data transmitted by a high-frequency signal in accordance with the correlation value.

In the portable electronic apparatus, the IC card and the reader/writer described above, the correlation value denoting sameness between the clock signal and the detected signal represents a high degree of similarity while the same logic level is in effect despite externally applied noises or duty ratio fluctuations. When data transmitted by the high-frequency signal are decoded in accordance with the correlation value, bit errors are sufficiently reduced regardless of the presence of external noise or the duty ratio changes.

Other objects, features and advantages of the invention will become more apparent upon a reading of the following description and appended drawings.

BRIEF DESCRIPTION OF THE DRAWINGS

FIGS. 2A through 2J are timing charts for explaining the principles of decoding of receive data by the reception circuit of FIG. 1;

FIGS. 3A and 3B are schematic views for explaining a memory in the reception circuit of FIG. 1;

FIGS. 4A through 4E are timing charts for explaining how clock phases are switched in the reception circuit of FIG. 1;

FIGS. 5A through 5D are timing charts for explaining how the reception circuit of FIG. 1 works;

FIGS. 7A, 7B and 7C are timing charts for explaining the principles of decoding of receive data by the reception circuit of FIG. 6;

FIGS. 10A through 10F are more timing charts for explaining how the reception circuit of FIG. 6 works when the duty ratio fluctuates;

FIG. 11 is a block diagram of a conventional IC card system;

FIGS. 14A through 14F are timing charts for explaining how the reception circuit of FIG. 13 works; and FIGS. 15A-1, 15A-2, 15B, 15C-1 and 15C-2 are timing charts for explaining how the reception circuit of FIG. 13 works when the duty ratio fluctuates.

DESCRIPTION OF THE PREFERRED EMBODIMENTS

Preferred embodiments of this invention will now be described with reference to the accompanying drawings.

(1) First Embodiment (1-1) Structure of the First Embodiment

Figure 1:
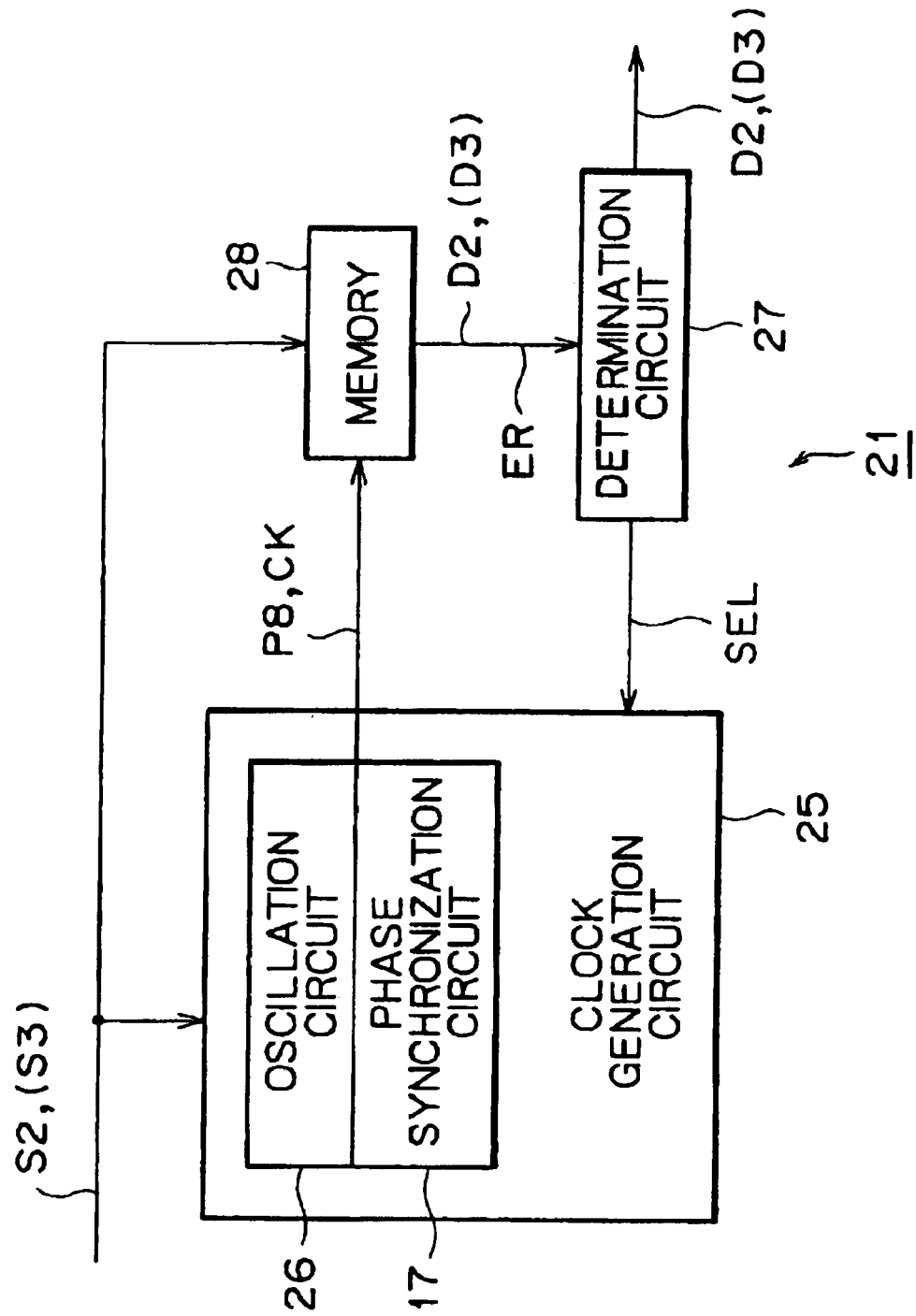
FIG. 1 is a block diagram of a reception circuit used in an IC card system practiced as a first embodiment of this invention.

FIG. 1 is a block diagram of a reception circuit used in an IC card and a reader/writer practiced as the first embodiment of this invention.

In this reception circuit 21, a clock generation circuit 25 regenerates a clock signal CK from receive signals S2 and S3. More specifically, an oscillation circuit 26 in the clock generation circuit 25 generates a rectangular wave signal having a frequency eight times as high as that of the clock signal derived from the receive signals S2 and S3. The rectangular wave signal is then divided by eight to generate the clock signal CK. The clock signal CK thus generated is compared in phase with the receive signals S2 and S3 by a phase synchronization circuit 17 in the clock generation circuit 25. Based on the result of the comparison, the phase synchronization circuit 17 corrects in phase the rectangular wave signal from the oscillation circuit 26. The clock generation circuit 25 further rectifies in waveform the rectangular wave signal from the oscillation circuit 26 to output a sampling signal P8. The sampling signal P8 has eight leading edges per clock cycle of receive data D2 and D3 assigned to the receive signals S2 and S3. In addition, the clock generation circuit 25 changes the timing of dividing the rectangular wave signal in accordance with a selection signal SEL from a determination circuit 27. If the clock signal CK is judged locked in opposite phase with regard to the receive signals S2 and S3, the clock signal CK is output with its phase switched so that the signal is locked in phase.

A memory 28 is used to latch signal levels of the receive signals S2 and S3 at the leading edges of the sampling signal P8 in reference to the clock signal CK. After eight consecutive samples are taken (each logical 1 or 0 through binarization), the sampled results are used as addresses whereby internally held data are output. In this manner, the reception circuit 21 outputs logic values of the receive data D2 and D3 in accordance with a time series distribution of the receive signals S2 and S3 in logic values per clock cycle.

Figure 2A:
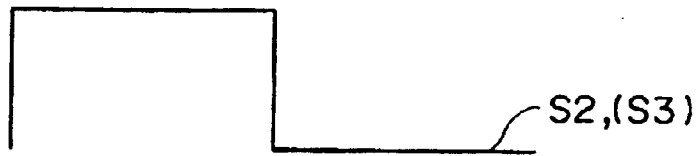
Figure 2B:
Figure 2D:
Figure 2E:
Figure 2G:
Figure 2I:

With the first embodiment, Manchester encoding is applied to the receive signals S2 and S3. For this reason, as shown in FIGS. 2A through 2J, the receive signals S2 and S3 reflect the logic values of the receive data D2 and D3 in the results DS of eight consecutive samples per cycle where no noise is introduced and where binarization is correctly effected with a duty ratio of 50 percent. That is, if the receive data D2 and D3 are made of logical 1's, the first four samples are composed of continuous logical 1's and the ensuing four samples are constituted by logical 0's in a row (FIGS. 2A through 2C). On the other hand, if the receive data D2 and D3 consist of logical 0's, then the first four samples are made of consecutive logical 0's, and the ensuing four samples are composed of logical 1's in a row (FIGS. 2D through 2F).

In the above setup, if noise is introduced or if the duty ratio is altered by jitters, the logic values of the first four samples and those of the ensuing four samples vary depending on when the noise is introduced and how the duty ratio is altered. In this case, however, the distribution of logic values in the first four samples and in the ensuing four samples still reflect the logic values of the receive data D2 and D3. That is, as long as the receive data D2 and D3 are on the same logic level, their logic values represent a constant tendency in distribution when sampled.

According to the principles outlined above, the memory 28 puts into addresses the results of all eight samples taken while noise is being introduced or jitters are being generated, as shown in FIGS. 3A and 3B. The addresses are used as the basis for outputting the logic values of the receive data D2 and D3. In this manner, the memory 28 decodes the receive data D2. and D3 based on the distribution of the sampled results. FIG. 3A shows addresses in the memory 28 from which the receive data D2 and D3 of logical 1's are output, and FIG. 3B indicates addresses in the memory 28 from which the receive data D2 and D3 of logical 0's are output.

If no access is available to any logic values corresponding to the addresses, that means the clock signal CK is located in opposite phase with respect to the receive signals S2 and S3. In this case, an error signal ER is output to indicate the difficulty of such access.

Illustratively, suppose that the receive data D2 and D3 are constituted by a sequence of the same logic value (logical 1 in this case) in the Manchester-encoded receive signals S2 and S3, as shown in FIGS. 4A through 4E. In this case, the receive signals S2 and S3 have their logic values switched per half-cycle of the clock signal CK (FIG. 4A). The signal level is switched in synchronism with the alternating signal level of the clock signal CK (FIGS. 4A and 4B).

If logic value changes occur in the receive data D2 and D3 when the data are made of a series of the same logic value, then the receive signals D2 and D3 at time t1 and time t2 have a sequence of the same logic value between cycles of the clock signal CK (FIGS. 4B and 4C). In this case, too, the receive signals S2 and S3 have their logic values inverted approximately in the middle of one cycle of the clock signal CK.

If the clock signal CK is locked in opposite phase, then the same logic value continues during each cycle of the clock signal CK, as shown in a period T in FIGS. 4D and 4E. Because Manchester encoding has no pattern in which the same logic value continues during each cycle of the clock signal CK, the presence of such a pattern helps determine that the clock signal is locked in opposite phase.

The memory 28 has the above-described addresses established therein so as to output an error signal ER regarding all sampled results that may occur if noise is introduced or if the duty ratio is altered while the clock signal is being locked in opposite phase.

If the error signal ER is output by the memory 28, the determination circuit 27 outputs a selection signal SEL to the clock generation circuit 25 so that the clock signal CK locked in opposite phase is brought back into phase. Furthermore, the determination circuit 27 retains for a predetermined period the receive data D2 and D3 coming from the memory 28. If no error signal ER comes from the memory 28, the retained receive data D2 and D3 are output.

Thus, as shown in FIGS. 4A through 4E, the clock signal CK (FIG. 5D) is generated in reference to the receive signals S2 and S3 (FIG. 5A). Then the sampling signal P8 (FIG. 5B) is generated with a frequency eight times as high as that of the clock signal CK. The sampling signal P8 is used to sample the receive signals S2 and S3, resulting in sampled results DS (FIG. 5C). The sampled results.DS provide the basis for decoding the receive data D2 and D3.

(1-2) Workings of the First Embodiment

In the IC card system of the above constitution (see FIG. 11), the IC card 2 is brought near the reader/writer 3. The proximity induces on the antenna of the IC card 2 a high-frequency signal transmitted from the reader/writer 3. Suitable processing of the high-frequency signal allows the IC card 2 to receive a call from the reader/writer 3. The processing causes the IC card 2 to switch the terminal impedance of its antenna and transmit a response to the call. The response allows the reader/writer 3 to switch the terminal impedance of its antenna and transmit to the IC card 2 necessary data for mutual authorization. The IC card 2 sends appropriate data likewise in response to the transmitted data. These steps are repeated so that the reader/writer 3 and IC card 2 exchange data therebetween and the internal memory of the IC card 2 is accessed.

During such data exchanges, the wireless interfaces 8 and 10 in the reader/writer 3 and IC card 2 detect the high-frequency signal induced on their respective antennas. The detected signals are put into binary format to generate the receive signals S2 and S3. The receive signals S2 and S3 in turn are used to generate the clock signal CK. With the clock signal CK set as the reference, the receive signals S2 and S3 are latched successively, whereby the data transmitted from the reader/writer 3 and IC card 2 are decoded.

With the first embodiment performing the above processing, the oscillation circuit 26 (FIG. 1) of the reception circuit 21 in the IC card 2 and reader/writer 3 generates a sampling signal P8 having a frequency eight times that of the clock of the receive signals S2 and S3. A clock signal CK is generated by dividing the sampling signal P8. Under control of the phase synchronization circuit 17, the clock signal CK is synchronized in phase with the receive signals S2 and S3. With the clock signal CK and sampling signal P8 used as the reference, the receive signal S2 in each cycle is sampled eight times to provide logic values. The logic values thus acquired are used as addresses whereby the memory 28 is accessed.

In the manner described, the IC card system samples the receive signals S2 and S3 at high speed and, based on how the logic values of the sampled results are distributed, causes the memory 28 to output decoded results of the receive data D2 and D3. Even if noise is introduced into the receive signals S2 and S3 or if their duty ratio is altered, the logic value distribution shows a constant tendency as long as the logic level of the receive data D2 and D3 remains the same. The IC card system thus decodes the receive data D2 and D3 on the basis of how the logic values of the sampled results are distributed. Even if the receive signals S2 and S3 have their signal level partially changed due to external noise or if their duty ratio is varied by jitters, the receive data D2 and D3 are correctly decoded. This allows the IC card system effectively to bypass bit errors. As a result, the IC card need not be brought as close to the reader/writer as before when it comes to correctly exchanging data between the reader/writer and the IC card. Host systems incorporating the inventive IC card system can thus operate more efficiently than before.

If an attempt to access the memory 28 based on eight samples reveals they stem from a continuation of the same logic value, then the reception circuit 21 causes the memory 28 to output the error signal ER. The error signal ER causes the determination circuit 27 to switch the clock signal CK in phase. This constitutes a scheme that determines whether the clock signal CK is in phase or in opposite phase based on the result of eight samples, whereby the clock signal CK is set to be locked in phase.

(1-3) Effects of the First Embodiment

The first embodiment of the above constitution detects a high-frequency signal induced on antennas and subjects the detected signal to binarization to produce receive signals S2 and S3. The embodiment then samples the receive signals S2 and S3 at high speed to find a distribution of their logic values in the sampled results. Based on the logic value distribution, the first embodiment decodes receive data D2 and D3 with a sufficiently reduced amount of bit errors despite possible deterioration of the receive signals due to the presence of noise or other disturbances.

The detected signal is put into binary format to generate the receive signals S2 and S3, which in turn are sampled to find a distribution of their logic values. The simplified scheme still allows the receive data D2 and D3 to be decoded properly.

(2) Second Embodiment (2-1) Structure of the Second Embodiment

Figure 6:
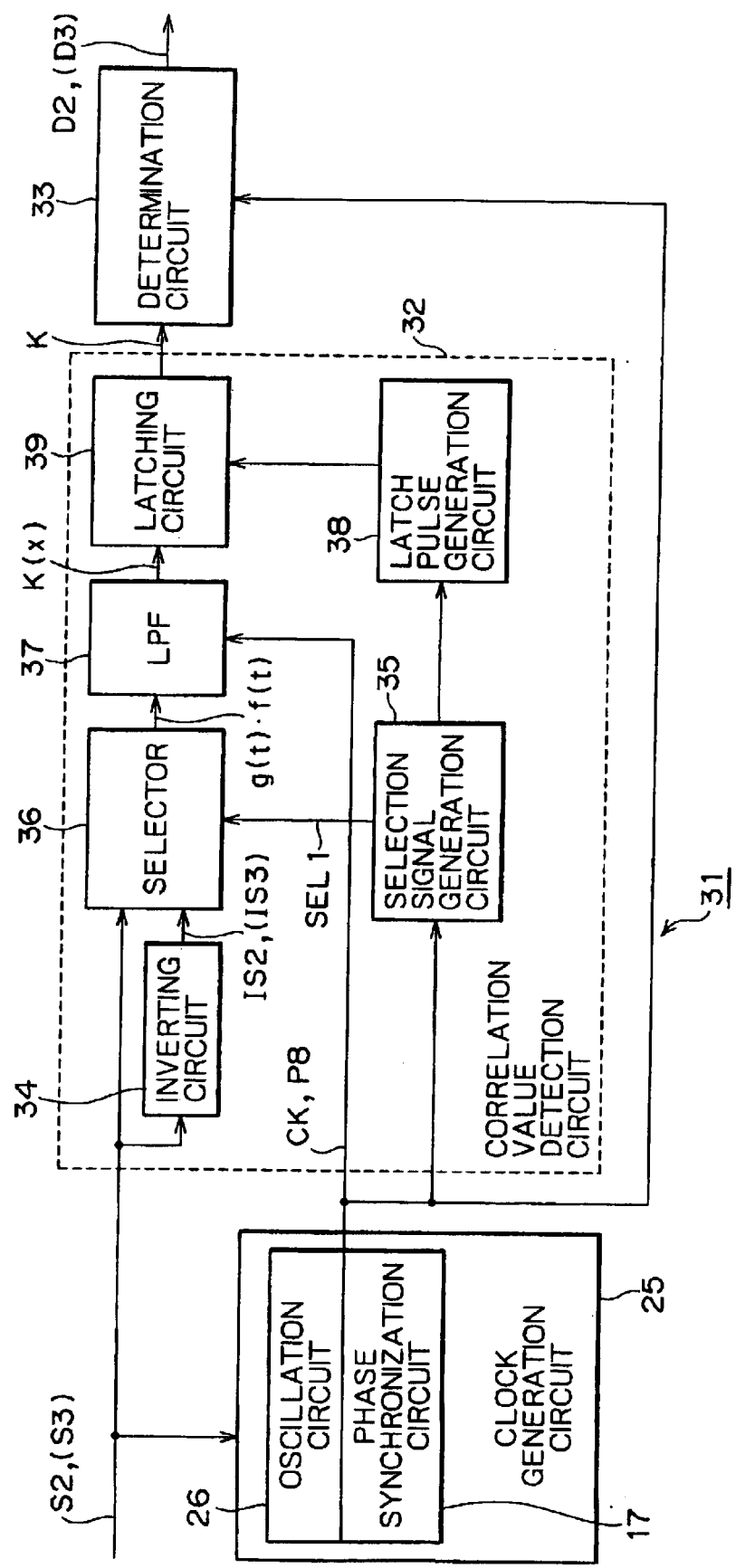
FIG. 6 is a block diagram of a reception circuit used in an IC card system practiced as a second embodiment of the invention.

FIG. 6 is a block diagram of a reception circuit used in an IC card and a reader/writer practiced as the second embodiment of the invention. In the second embodiment, the parts having the same or corresponding functions as their counterparts in the reception circuit 6 or 12 described above with reference to FIG. 1 are designated by like reference numerals, and their descriptions are omitted to avoid unnecessary repetition.

In the second embodiment, a correlation value detection circuit 32 detects a correlation value signal K indicative of a degree of similarity in signal waveform between a clock signal CK on the one hand and receive signals S2 and S3 on the other hand. The correlation value signal K is output to a determination circuit 33. In turn, the determination circuit 33 regenerates data D2 and D3 through a determination process on the correlation value signal K and outputs the regenerated data.

In decoding the receive data D2 and D3 based on the correlation value signal K, the second embodiment defines a correlation value K(x) by which to generate the correlation value signal K using an expression (1) shown below. In the expression that follows, T represents one cycle of the receive signals S2 and S3 and also denotes one cycle of the clock signal CK, f(t) stands for the signal level of the receive signals S2 and S3, and g(t) indicates the signal level of the clock signal CK. The scope of integration ranges from "x" to "x+T". The correlation value is defined as follows:

$$K(x) = \int f(t) \cdot g(t) dt \quad (1)$$

In the expression above, the correlation value K(x) becomes larger when f(t) and g(t) are in phase with each other and present the same tendency of changes. If f(t) and g(t) are getting out of phase, the correlation value K(x) is reduced by an amount corresponding to the shift. If f(t) and g(t) are in opposite phase with each other, the correlation value K(x) is reduced to the smallest possible number.

As shown in FIGS. 7A through 7C, when the clock signal CK (FIG. 7B) is in phase with the receive signals S2 and S3 (FIG. 7A), the correlation value K(x) becomes larger (FIG. 7C). When the clock signal CK is in opposite phase with the receive signals S2 and S3, the correlation value K(x) becomes smaller (FIG. 7C). Thus, even if noise is being introduced or if the duty ratio is being altered, the values that may be taken to represent the correlation remain similar as long as the receive data D2 and D3 are at the same logic level. As a result, the correlation value K(x) is determined at the bit boundaries of the receive signals S2 and S3 in reference to an intermediate value REF between the largest and the smallest numbers that may be taken by the correlation value K(x), whereby the receive data D2 and D3 are decoded. The correlation value K(x) shown in FIG. 7C has its amplitude limited by the dynamic range of the circuit arrangement in charge of the processing.

Figures 8A, 8B, 8C:
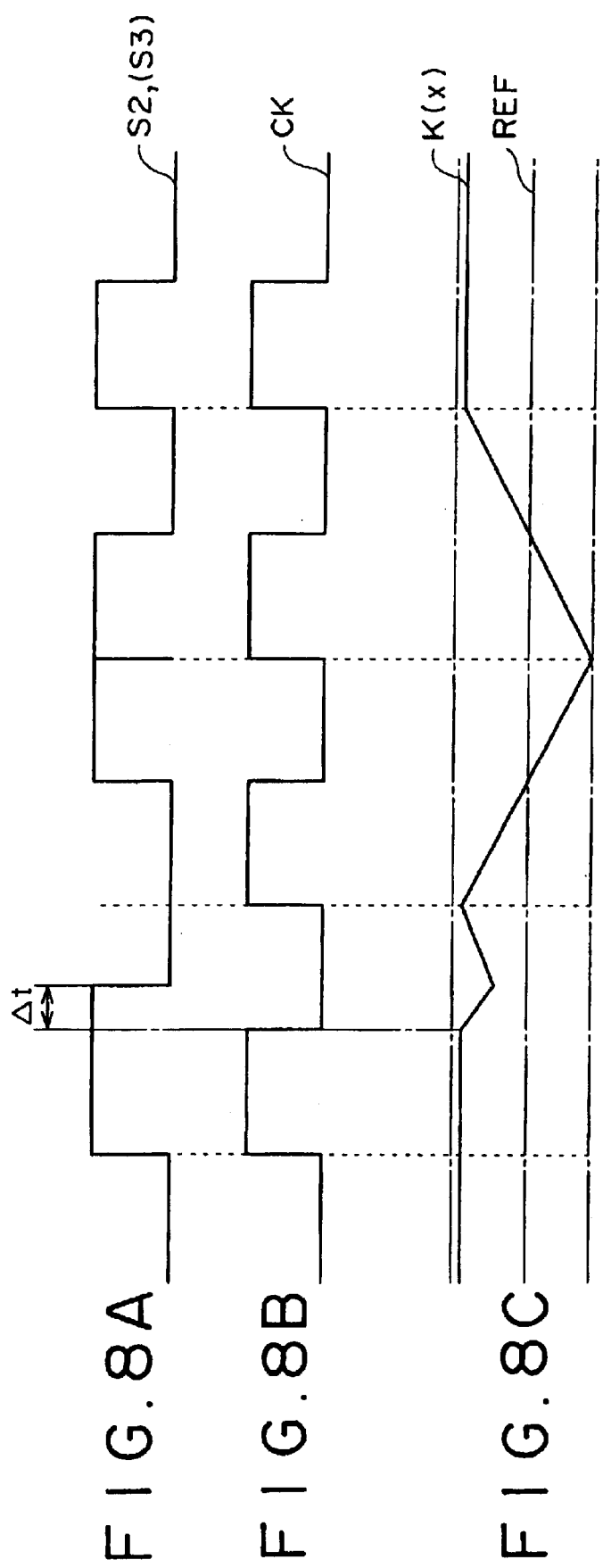
FIGS. 8A, 8B and 8C are timing charts in effect when a duty ratio fluctuates during decoding of receive data by the reception circuit of FIG. 6.

If the receive signals S2 and S3 are subject to jitters so that changes in their signal level are shifted by a time period Δt (FIGS. 8A and 8B), then the correlation value K(x) is varied by an amount corresponding to the shift (FIG. 8C). Nevertheless, if the correlation value K(x) is determined at bit boundaries of the receive signals S2 and S3 in reference to the intermediate value REF, it is possible to decode the receive data D2 and D3 correctly.

If noise is introduced, the correlation value K(x) is also altered by an amount corresponding to the noise. However, if the correlation value K(x) is determined at bit boundaries of the receive signals S2 and S3 in reference to the intermediate value REF, the receive data D2 and D3 are decoded correctly.

Figures 9A, 9B, 9C, 9D, 9E, 9F:
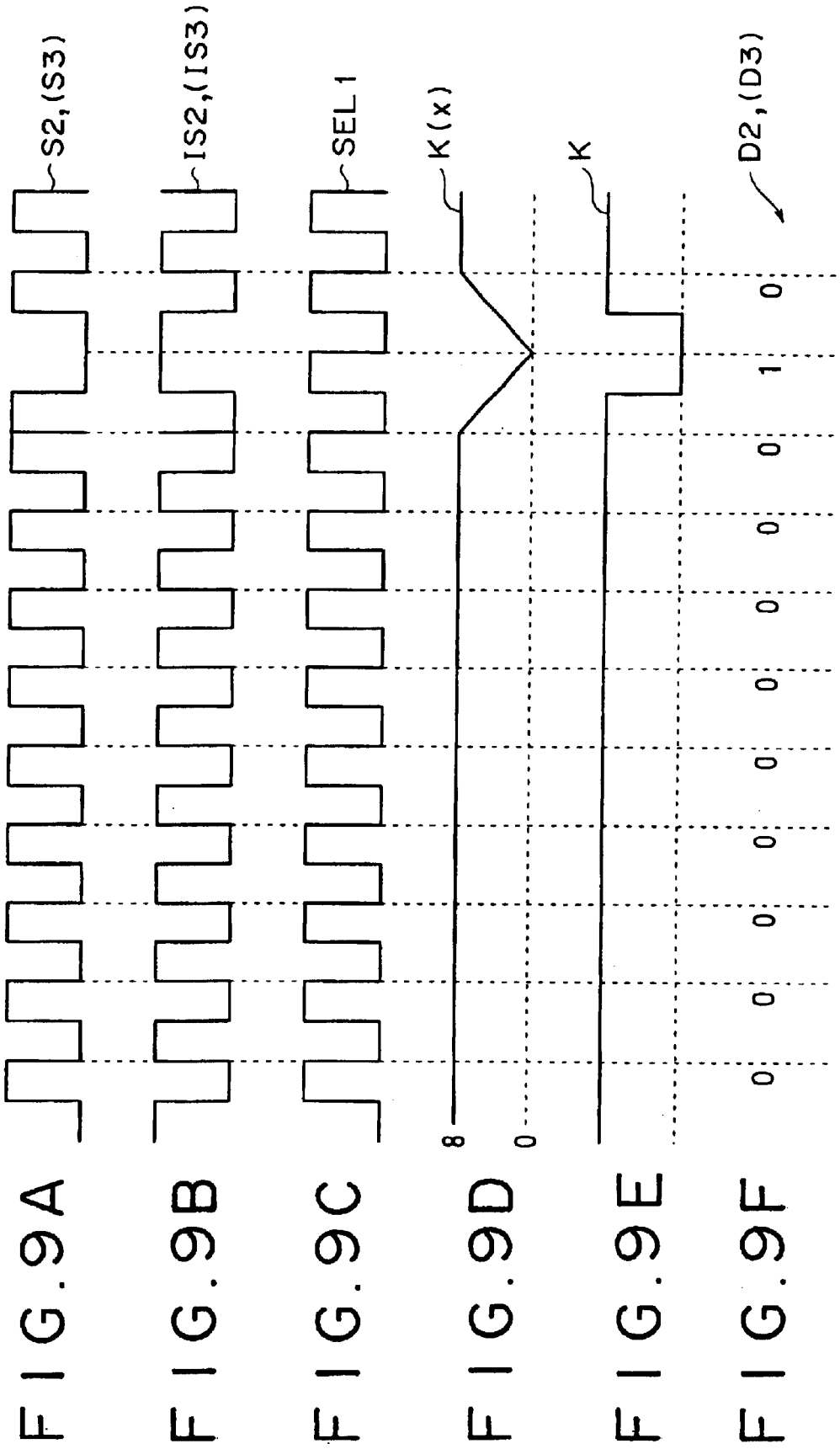
FIGS. 9A through 9F are timing charts for explaining how the reception circuit of FIG. 6 works.
Figure 12A:
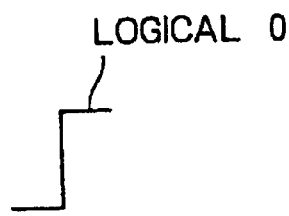
FIGS. 12A and 12B are timing charts for explaining Manchester encoding applied to the IC card system of FIG. 11.
Figure 12B:
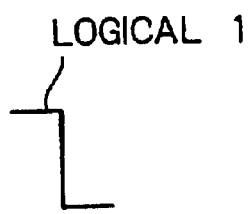
Figure 13:
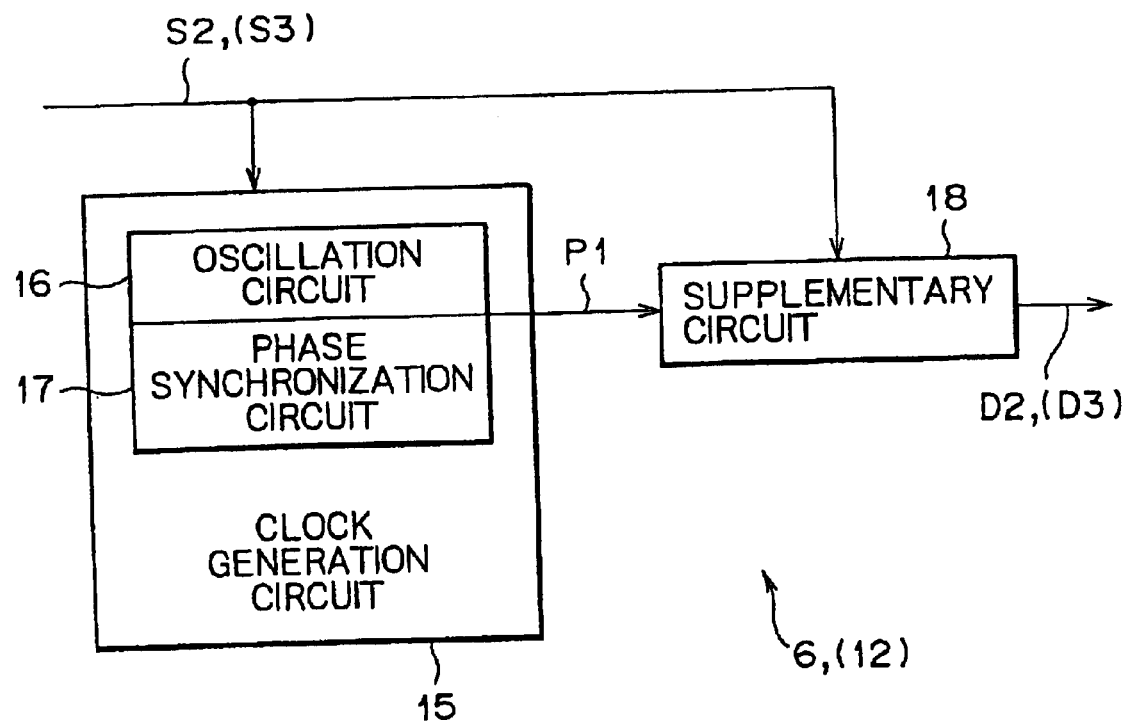
FIG. 13 is a block diagram of a reception circuit used in the IC card system of FIG. 11.

According to the principles outlined above, the correlation value detection circuit 32 supplies an inverting circuit 34 with the receive signals S2 and S3 (as shown in FIG. 9A). The inverting circuit 34 inverts the polarity of the receive signals S2 and S3 to generate inverted receive signals IS2 and IS3 (FIG. 9B). A selection signal generation circuit 35 changes the polarity of the clock signal CK to generate a selection signal SEL1 (FIG. 9C). Given the selection signal SEL1, a selector 36 permits selective output of either the receive signals S2 and S3 or the inverted receive signals IS2 and IS3. In this manner, the inverting circuit 34, selection signal generation circuit 35, and selector 36 generate and output a multiplication signal defined as f(t)·g(t) in expression (1) above.

A low-pass filter (LPF) 37 integrates the multiplication signal and outputs the result. Specifically, the low-pass filter 37 integrates the multiplication signal by adding it cyclically in reference to the sampling signal P8 so as to generate the correlation value K(x). The result of the integration is limited by the dynamic range in effect when eight samples taken provide consecutive products. The low-pass filter (LPF) 37 then outputs correlation values K(x) varying from 8 to 0 (FIG. 9D).

A latch pulse generation circuit 38 generates a latch pulse signal whose signal level rises at the bit boundaries of the receive signals S2 and S3 in reference to the clock signal CK. Given the latch pulse signal, a latching circuit 39 latches the signal output from the low-pass filter 37, thereby generating and outputting the correlation value signal K (FIG. 9E).

A determination circuit 40 in the reception circuit 31 determines the correlation value signal K with regard to the reference value REF mentioned above and thereby decodes the receive data D2 and D3 (FIG. 9F). As shown in FIGS. 10A through 10F in contrast with FIGS. 9A through 9F, the receive signals D2 and D3 are correctly decoded even if noise is introduced or if the edges of the receive signals S2 and S3 are shifted by the amount corresponding to the time period Δt, the shift being attributable to signal jitters.

(2-2) Workings of the Second Embodiment

In the IC card system of the above constitution practiced as the second embodiment, the reception circuit 31 of the reader/writer and IC card generates a clock signal and, in reference to the generated clock signal, regenerates receive data D2 and D3 from the receive signals S2 and S3.

From the receive signals S2 and S3, the inverting circuit 34 generates inverted receive signals IS2 and IS3 having the inverted polarity. A selection signal SEL generated by inverting the clock signal CK in polarity causes the selector 36 to permit selective output of either the receive signals S2 and S3 or the inverted receive signals IS2 and IS3. A multiplication signal is then generated by multiplying the clock signal CK and the receive signals S2 and S3. The multiplication signal is integrated by the low-pass filter 37 generating the correlation value K(x) indicative of the degree of similarity between the clock signal CK on the one hand and the receive signals S2 and S3 on the other hand.

Even where noise is being introduced or the duty ratio is being altered, the correlation value K(x) represents a high degree of sameness, as long as the receive data D2 and D3 are at the same logic level. In such a case, the latching circuit 39 in the reception circuit 31 latches the correlation value K(x) of the receive data D2 and D3 at their bit boundaries. The latched results are determined by the determination circuit 40 so as to decode the receive data D2 and D3.

In the manner described, the reception circuit 31 decodes data transmitted by a high-frequency signal in accordance with the correlation value K(x). During the decoding, bit errors are sufficiently reduced even in the presence of external noises or in the face of duty ratio fluctuations.

(2-3) Effects of the Second Embodiment

The second embodiment of the above constitution decodes target data by detecting the correlation value K(x) representing sameness between the clock signal and the detected signal. The scheme makes it possible sufficiently to reduce bit errors despite possible quality deterioration that may occur in the signal obtained by detecting the high-frequency signal induced on the antenna.

The correlation value K(x) is detected using the receive signals S2 and S3 acquired by putting the detected signal into binary format. This setup, though simple in structure, still permits proper detection of the receive data D2 and D3.

(3) Other Embodiments

Although the foregoing embodiments were shown subjecting the detected signal to binarization for sampling purposes and detecting the correlation value K(x) involved, this does not limit the invention. Alternatively, the detected signal may be processed directly.

The second embodiment was shown latching the correlation value K(x) prior to the determination process based on the reference level REF in order to decode the receive data D2 and D3. Alternatively, a binarization process with respect to an appropriate reference level may precede the latching process.

With the second embodiment, the correlation value K(x) was shown limited by a suitable dynamic range. However, this does not limit the invention. Alternatively, integrated results may be reset per the clock cycle of the receive signals S2 and S3 so as to detect the correlation value K(x).

With the first embodiment, the internal memory was shown accessed per clock cycle in decoding the receive data D2 and D3 directly. Alternatively, the results of eight continuous samples may be shifted successively for access to the memory. As another alternative, the sampled results may be converted to a continuation of logic values corresponding to the eight samples so that the receive data D2 and D3 may be decoded.

Although the foregoing embodiments were shown processing the high-frequency signal through amplitude modulation, this does not limit the invention. Alternatively, the invention applies extensively to other modulation systems, including that of frequency modulation.

In the foregoing embodiments, target data were shown Manchester-encoded before being transmitted. Alternatively, the invention also applies to other diverse encoding schemes.

Although the invention was described as applicable to an IC card system in the foregoing embodiments, this does not limit the invention. Alternatively, the invention applies extensively to diverse kinds of portable electronic apparatuses that process wirelessly transmitted data. The IC card described above in connection with the embodiments may be replaced by many other portable electronic apparatuses having shapes other than a card. The inventive functions may be incorporated into mobile telephones, wristwatches, portable personal computers and other portable terminals. The inventive IC card when used may also be inserted into any of these portable apparatuses.

As described and according to the invention, detected results are sampled at high speed for generating a detected signal, and data are decoded on the basis of a signal level distribution of the detected signal. Data are also decoded by detecting a correlation value indicative of sameness between a clock signal and the detected signal. In this manner, bit errors are sufficiently reduced during the decoding even if there occurs a deterioration of quality in the detected signal acquired by detecting a high-frequency signal induced on an antenna in use.

While preferred embodiments of the invention have been described using specific terms, such description is for illustrative purposes only, and it is to be understood that changes and variations may be made without departing from the spirit or scope of the claims that follow.

What is claimed is:

1. A portable electronic apparatus comprising:
   a clock generation circuit, said clock generation using a received signal to generate a clock signal and a sampling signal,
      received data being the information transmitted to said portable electronic apparatus by way of said received signal,
      said sampling signal having a plurality of pulses during each cycle of said clock signal,
      a plurality of logic levels being generated during said each cycle of said clock signal,
      a logic level of said plurality of logic levels being the signal level of said received signal when sampled by a pulse of said plurality of pulses; and
   a decoder, said decoder decoding said plurality of logic levels to generate said received data.

2. The protable electronic apparatus according to claim 1, wherein the phase of said clock signal is compared to the phase of said received signal,
   said clock signal, when out of phase with said received signal, is brought into phase with said received signal.

3. The portable electronic apparatus according to claim 1, wherein said decoder includes a storage medium,
   said plurality of logic levels being used to address a storage medium location within said storage medium,
   said received data being stored at said storage medium location.

4. The portable electronic apparatus according to claim 1, wherein said received signal is wirelessly transmitted to said portable electronic apparatus.

5. The portable electronic apparatus according to claim 4, wherein said received signal is a modulated signal.

6. An IC card for receiving data transmitted by a reader/writer and for outputting data from an internal memory in return, said IC card comprising:
   a clock generation circuit, said clock generation circuit using a received signal to generate a clock signal and a sampling signal,
      received data being the information transmitted to said IC card by way of said received signal,
      said sampling signal having a plurality of pulses during each cycle of said clock signal,
      a plurality of logic levels being generated during said each cycle of said clock signal,
      a logic level of said plurality of logic levels being the signal level of said received signal when sampled by a pulse of said plurality of pulses; and a decoder, said decoder decoding said plurality of logic levels to generate said received data.

7. The IC card according to claim 6, wherein the phase of said clock signal is compared to the phase of said received signal,
said clock signal, when out of phase with said received signal, is brought into phase with said received signal.

8. The IC card according to claim 6, wherein said decoder includes a storage medium,
said plurality of logic levels being used to address a storage medium location within said storage medium,
said received data being stored at said storage medium location.

9. The IC card according to claim 6, wherein said received signal is wirelessly transmitted to said portable electronic apparatus.

10. A reader/writer for receiving data transmitted by an IC card, said reader/writer comprising:
a clock generation circuit, said clock generation circuit using a received signal to generate a clock signal and a sampling signal,
received data being the information transmitted to said reader/writer by way of said received signal,
said sampling signal having a plurality of pulses during each cycle of said clock signal,
a plurality of logic levels being generated during said each cycle of said clock signal,
a logic level of said plurality of logic levels being the signal level of said received signal when sampled by a pulse of said plurality of pulses; and
a decoder, said decoder decoding said plurality of logic levels to generate said received data.

11. The reader/writer according to claim 10, wherein the phase of said clock signal is compared to the phase of said received signal,
said clock signal, when out of phase with said received signal, is brought into phase with said received signal.

12. The reader/writer according to claim 10, wherein said decoder includes a storage medium,
said plurality of logic levels being used to address a storage medium location within said storage medium,
said received data being stored at said storage medium location.

13. The reader/writer according to claim 10, wherein said received signal is wirelesely transmitted to said portable electronic apparatus.

14. A portable electronic apparatus comprising:
a clock generation circuit, said clock generation circuit using a received signal to generate a clock signal,
received data being the information transmitted to said portable electronic apparatus by way of said received signal; and
a correlation value detection circuit, said correlation value detection circuit comparing the phase of said clock signal to the phase of said received signal to generate a correlation value signal,
said correlation value signal trending in a first direction when sail clock signal is in phase with said received signal and trending in a direction opposite to said first direction when said clock signal is out of phase with said received signal;
a determination circuit, said determination circuit using said correlation value signal to generate said received data.

15. The portable electronic apparatus according to claim 14, wherein a value of said correlation value signal establishes the logic level of said received data, said logic level being one of a "0" logic level and a "1" logic level.

16. The portable electronic apparatus according to claim 14, wherein said first direction is an increasing direction and said direction opposite to said first direction is a decreasing direction.

17. The portable electronic apparatus according to claim 14, wherein said correlation value signal is bounded by a maximum amount and a minimum amount, said minimum amount being less than said maximum amount.

18. An IC card for receiving data transmitted by a reader/writer and for outputting data from an internal memory in return, said IC card comprising:
a clock generation circuit, said clock generation circuit using a received signal to generate a clock signal,
received data being the information transmitted to said IC card by way of said received signal; and
a correlation value detection circuit, said correlation value detection circuit comparing the phase of said clock signal to the phase of said received signal to generate a correlation value signal,
said correlation value signal trending in a first direction when said clock signal is in phase with said received signal and trending in a direction opposite to said first direction when said clock signal is out of phase with said received signal;
a determination circuit, said determination circuit using said correlation value signal to generate said received data.

19. The IC card according to claim 18, wherein a value of said correlation value signal establishes the logic level of said received data, said logic level being one of a "0" logic level and a "1" logic level.

20. The IC card according to claim 18, wherein said first direction is an increasing direction and said direction opposite to said first direction is a decreasing direction.

21. An IC card according to claim 18, wherein said correlation value signal is bounded by a maximum amount and a minimum amount, said minimum amount being less than said maximum amount.

22. A reader/writer for receiving data transmitted by an IC card, said reader/writer comprising:
a clock generation circuit, said clock generation circuit using a received signal to generate a clock signal,
received data being the information transmitted to said reader/writer by way of said received signal; and
a correlation value detection circuit, said correlation value detection circuit comparing the phase of said clock signal to the phase of said received signal to generate a correlation value signal,
said correlation value signal trending in a first direction when said clock signal is in phase with said received signal and trending in a direction opposite to said first direction when said clock signal is out of phase with said received signal;
a determination circuit, said determination circuit using said correlation value signal to generate said received data.

23. The reader/writer according to claim 22, wherein a value of said correlation value signal establishes the logic level of said received data, said logic level being one of a "0" logic level and a "1" logic level.

24. The reader/writer according to claim 22, wherein said first direction is an increasing direction and said direction opposite to said first direction is a decreasing direction.

25. The reader/writer according to claim 22, wherein said correlation value signal is bounded by a maximum amount and a minimum amount, said minimum amount being less than said maximum amount.

* * * * *

UNITED STATES PATENT AND TRADEMARK OFFICE
CERTIFICATE OF CORRECTION

PATENT NO.   : 6,886,752 B2
DATED        : May 3, 2005
INVENTOR(S)  : Yuji Murayama et al.

It is certified that error appears in the above-identified patent and that said Letters Patent is hereby corrected as shown below:

Column 12,
Line 22, "generation using" should read -- generation circuit using --.
Line 37, "protable" should read -- portable --.

Column 13,
Line 58, "sail" should read -- said --.

Signed and Sealed this

Sixth Day of September, 2005

JON W. DUDAS
*Director of the United States Patent and Trademark Office*